United States Patent
Wang et al.

(10) Patent No.: US 11,961,324 B2
(45) Date of Patent: Apr. 16, 2024

(54) OPTICAL FINGERPRINT RECOGNITION DEVICE AND FINGERPRINT SENSING DEVICE THEREOF

(71) Applicant: Novatek Microelectronics Corp., Hsinchu (TW)

(72) Inventors: Shu-Fang Wang, Hsinchu (TW); Wan-Ting Huang, Hsinchu County (TW); Kuan-Ting Lee, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/088,624

(22) Filed: Dec. 26, 2022

(65) Prior Publication Data

US 2023/0215214 A1    Jul. 6, 2023

Related U.S. Application Data

(60) Provisional application No. 63/295,938, filed on Jan. 2, 2022.

(51) Int. Cl.
*G06F 3/041* (2006.01)
*G06V 40/12* (2022.01)
*G06V 40/13* (2022.01)

(52) U.S. Cl.
CPC ...... *G06V 40/1394* (2022.01); *G06V 40/1318* (2022.01); *G06V 40/1365* (2022.01); *G06V 40/1388* (2022.01)

(58) Field of Classification Search
CPC ........... G06V 40/1394; G06V 40/1318; G06V 40/1365; G06V 40/1388
See application file for complete search history.

(56) References Cited

U.S. PATENT DOCUMENTS

2016/0266695 A1*  9/2016  Bae ................ G06V 40/1318
2021/0264181 A1*  8/2021  Park .............. G06V 40/1318

FOREIGN PATENT DOCUMENTS

TW       202034136       9/2020

OTHER PUBLICATIONS

"Office Action of Taiwan Counterpart Application", dated Oct. 30, 2023, p. 1-p. 5.

* cited by examiner

*Primary Examiner* — Abdul-Samad A Adediran
(74) *Attorney, Agent, or Firm* — JCIPRNET

(57) ABSTRACT

An optical fingerprint recognition device includes a light-emitting diode (LED) array and a fingerprint sensing device. The LED array includes a central LED area and an edge LED area, and configured to display a light source pattern in response to a fingerprint sensing request. The light source pattern includes a central portion and a surrounding portion. During displaying the light source pattern, a plurality of red display subpixels of the central LED area are not illuminating and a plurality of red display subpixels of the edge LED area are illuminating. The fingerprint sensing device generates a first fingerprint image according to a plurality of first sensing signals obtained from a plurality of first sensing pixel area, and the first fingerprint image is adapted to be used for examining whether a finger which triggers the fingerprint sensing request is real or fake.

23 Claims, 9 Drawing Sheets

OPTICAL FINGERPRINT RECOGNITION DEVICE AND FINGERPRINT SENSING DEVICE THEREOF

CROSS-REFERENCE TO RELATED APPLICATION

This application claims the priority benefit of U.S. provisional application Ser. No. 63/295,938, filed on Jan. 2, 2022. The entirety of the above-mentioned patent application is hereby incorporated by reference herein and made a part of this specification.

BACKGROUND

Field of the Invention

The invention relates to an optical fingerprint recognition device and a fingerprint sensing device, and more particularly, to the optical fingerprint recognition device and the fingerprint sensing device thereof with an ani-fake function.

Description of Related Art

An optical fingerprint recognition operation of convention art provides a modular optical fingerprint recognition device by setting the modular optical fingerprint recognition device accompanying with a lens under a display panel (e.g., an OLED display panel) of an electronic device, where the electronic device may be a mobile phone for example. In the conventional art, the fingerprint recognition device realizes the fingerprint anti-counterfeiting function by displaying two different light source patterns on the display panel in sequence, wherein the light source patterns are used as the light source for fingerprint recognition. The fingerprint recognition device with the anti-counterfeiting function in the electronic device obtains fingerprint images respectively during the two light source patterns are displayed. The fingerprint image data is sent to a back-end processor, such as an application processor of the mobile phone, and the application processor can recognize whether the obtained fingerprint image matches a registered fingerprint of a user stored in the electronic device.

SUMMARY

The invention provides an optical fingerprint recognition device and a fingerprint sensing device thereof which can increase a sensing speed of a fingerprint recognition operation.

According to an embodiment of the invention, the optical fingerprint recognition device includes a light-emitting diode (LED) array and a fingerprint sensing device. The LED array has a plurality of LEDs operated as a plurality of display subpixels. The LED array includes a central LED area and an edge LED area surrounding the central LED area, and configured to display a light source pattern in response to a fingerprint sensing request. The light source pattern includes a central portion displayed by the central LED area and a surrounding portion surrounding the central portion displayed by the edge LED area. During displaying the light source pattern, a plurality of first LEDs, operated as red display subpixels of the central LED area, are not illuminating and a plurality of second LEDs, operated as red display subpixels of the edge LED area, are illuminating. The fingerprint sensing device includes a sensing pixel array and color filter units disposed above the sensing pixel array, wherein the sensing pixel array includes a first sensing pixel area and a second sensing pixel area surrounding the first sensing pixel area. The fingerprint sensing device is configured to generate a first fingerprint image according to a plurality of first sensing signals obtained from the first sensing pixel area, and the first fingerprint image is adapted to be used for examining whether a finger which triggers the fingerprint sensing request is real or fake.

According to an embodiment of the invention, the fingerprint sensing device includes a sensing pixel array and a plurality of color filter units. The sensing pixel array includes a first sensing pixel area and a second sensing pixel area surrounding the first sensing pixel area. The plurality of color filter units are disposed above the sensing pixel array. The first sensing pixel area is configured to obtain a plurality of first sensing signals and the fingerprint sensing device is configured to generate a first fingerprint image according to the first sensing signals. The first fingerprint image is adapted to be used for examining whether a finger which triggers the fingerprint sensing request is real or fake.

To sum up, the optical fingerprint recognition device of present disclosure provides a LED array having a central LED area and an edge LED area to display a light source pattern in response to a fingerprint sensing request. A fingerprint sensing device of the optical fingerprint recognition device is also provided to sense the light source pattern to generate a central fingerprint image and an edge fingerprint image. During displaying the light source pattern, red pixels of the central LED are not illuminating, and the central fingerprint image can be provided for examining whether a finger which triggers the fingerprint sensing request is real or fake. That is, in response to the fingerprint sensing request, merely one light source pattern is needed for the optical fingerprint recognition device of present disclosure. That is, a recognition time of the fingerprint recognition request can be saved.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
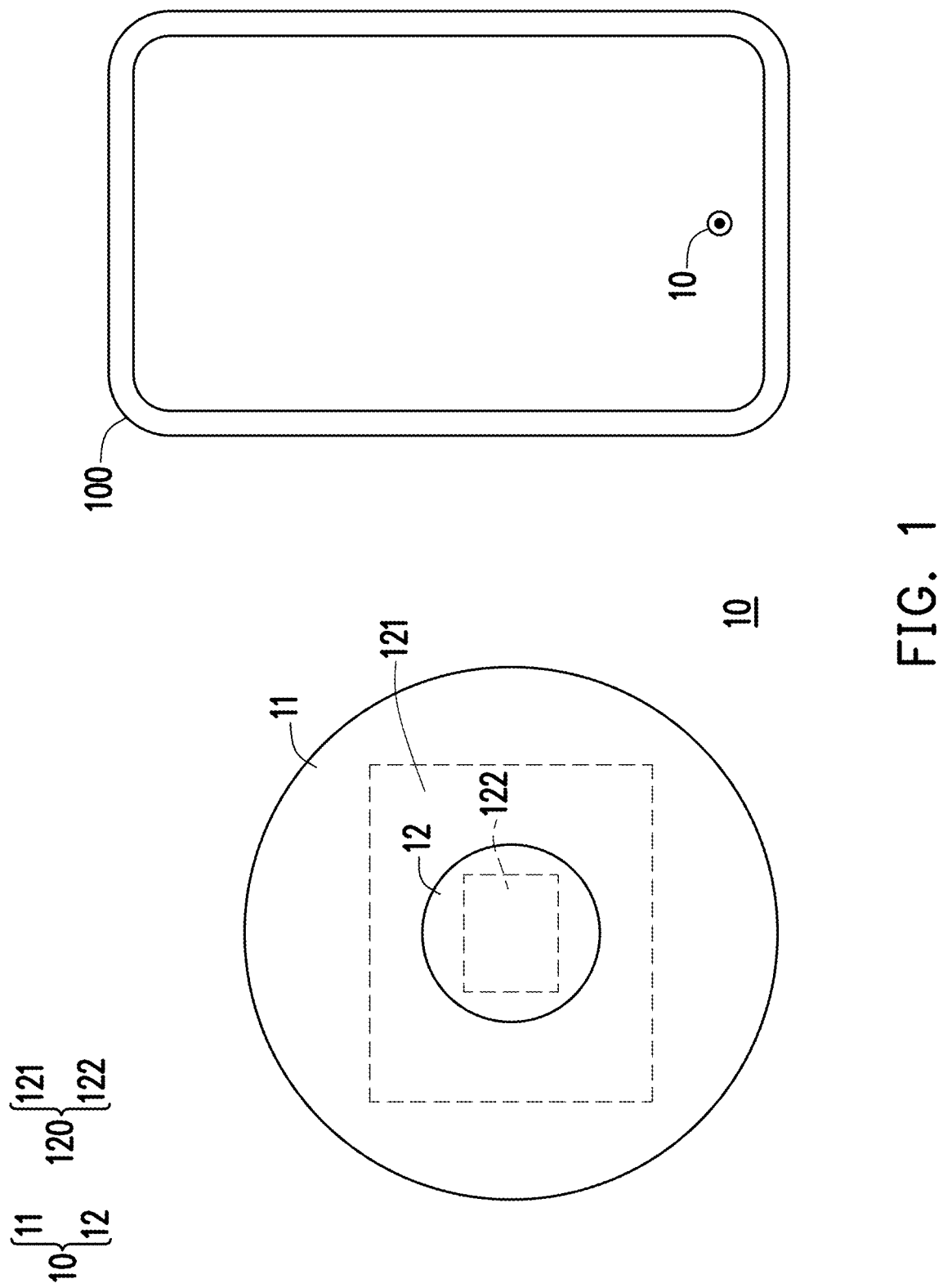
FIG. 1 and FIG. 2 respectively illustrate a top view and a cross section view of an optical fingerprint recognition device according to an embodiment of present disclosure.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 2:
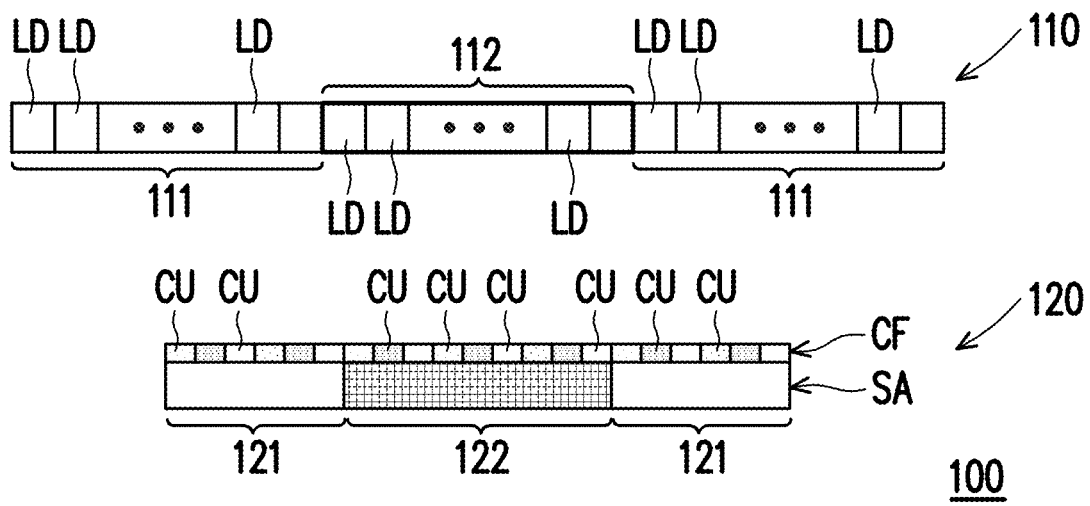

Please refer to FIG. 1 and FIG. 2. FIG. 1 is a diagram of a light source pattern 10 for fingerprint recognition displayed by a fingerprint recognition device 100 according to an embodiment of present disclosure, and FIG. 2 is a cross-sectional view of the fingerprint recognition device 100 according to an embodiment of present disclosure. The fingerprint recognition device 100 may be a handheld electronic device such as a mobile phone or a tablet computer The fingerprint recognition device 100 includes a light emitting diode (LED) array 110 and an optical fingerprint sensing device 120. The LED array 110 is a part of a display subpixel array of a display panel of the fingerprint recognition device 100, and the display panel may be an organic light emitting diode (OLED) display panel. Each LED of the LED array 110 is a subpixel of the display panel. The fingerprint sensing device 120 is disposed under the display panel of the fingerprint recognition device 100 and the LED array 110 and the fingerprint sensing device 120 are overlapped as viewing in the cross-sectional view.

The LED array 110 includes a central LED area 112 and an edge LED area 111. The edge LED area 111 surrounds the central LED area 112. The LED array 110 are configured to display a light source pattern 10 in response to a fingerprint sensing request, and the central LED area 112 displays a central portion 12 of the light source pattern 10, and the edge LED area 111 displays a surrounding portion 11 of the light source pattern 10. The central portion 12 is surrounded by the surrounding portion 11.

In detail, the central LED area 112 includes a plurality of LEDs LD, and the edge LED area 111 includes a plurality of LEDs LD, too. During displaying the light source pattern 10, a plurality of first LEDs operated as red display subpixels of the central LED area are not illuminating, and a plurality of second LEDs operated as red display subpixels of the edge LED area are illuminating. Furthermore, the central LED area of the LED array further includes a plurality of third LEDs, operated as blue display pixels, and a plurality of fourth LEDs, operated as green display pixels. The edge LED area of the LED array also includes a plurality of fifth LEDs, operated as blue display pixels, and a plurality of sixth LEDs operated as green display pixels. During displaying the light source pattern 10, the third LEDs are illuminating, or the fourth LEDs are illuminating, or the third LEDs and the fourth LEDs are illuminating. Also, during displaying the light source pattern 10, the fifth LEDs are illuminating, or the sixth LEDs are illuminating, or the fifth LEDs and the sixth LEDs are illuminating.

On the other hand, the fingerprint sensing device 120 includes a sensing pixel array SA and a color filter layer CF formed by a plurality of color filter units CU. The color filter layer CF is disposed above the sensing pixel array SA. The sensing pixel array SA can be divided into a first sensing pixel area 122 and a second sensing pixel area 121. The first sensing pixel area 122 is a central sensing pixel area, and is surrounded by the second sensing pixel area 121, where the second sensing pixel area 121 is an edge sensing pixel area.

When the LED array displays the light source pattern 10 in response to the fingerprint sensing request (which may be triggered by a finger touch event), the first sensing pixel area 122 of the fingerprint sensing device 120 is configured to generate a plurality of first sensing signals, and the fingerprint sensing device 120 generate a first fingerprint image according to the first sensing signals. The first sensing signals is regarding to a returned light from a part of the fingerprint located on the central portion 12 of the light source pattern 10. Furthermore, the first fingerprint image may be provided for examining whether a finger which triggers the fingerprint sensing request is real or fake.

In this embodiment, the realization of fingerprint anti-counterfeiting function is mainly based on the difference in the response of a real finger and a fake finger to a red incident light. If it is the fake finger, most of the incident red light may be reflected by the fake finger and little of the incident red light is absorbed by the fake finger. Red light intensity that can be sensed by the sensing pixel array is either too large or too small, so red sensing pixel data may be exceed (higher or lower) a predetermined range. On the other hand, if it is a real finger, the incident red light will be scattered in the finger after penetrating the finger, and the scattered light will return to be received by the sensing pixel array. Since the central portion 12 of the light source pattern 10 lacks of red light component, disturbance of red light from the central area of the light source pattern 10 to the first fingerprint image can be eliminated. That is, the finger is fake or real can be precisely determined according to the red light intensity of the first fingerprint image.

In this embodiment, an area enclosed by a boundary of the sensing pixel array 120 may be less than an area of the light source pattern 10. A luminance of the central LED area 112 may be less than a luminance of the edge LED area 111 when the light source pattern 10 is displayed.

Figure 3:
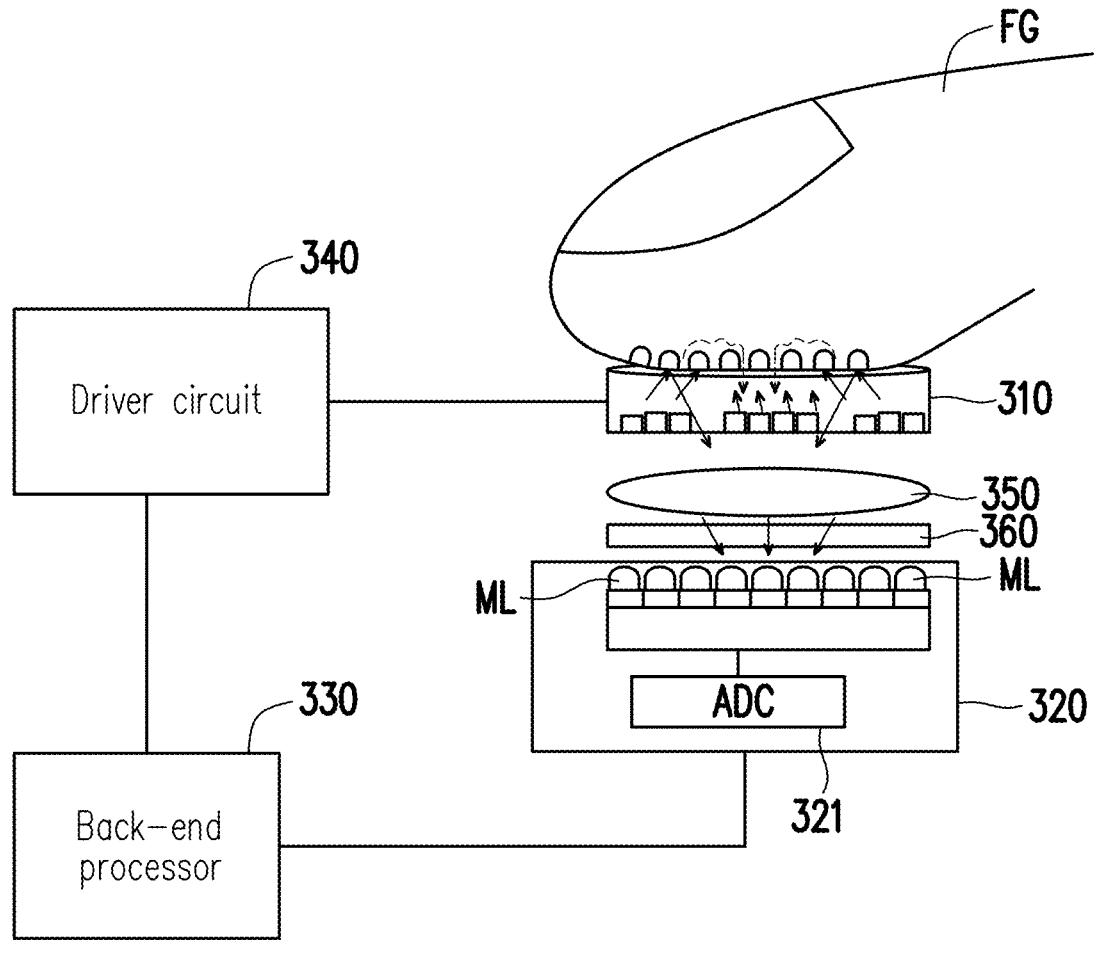
FIG. 3 illustrates an optical fingerprint recognition device according to another embodiment of present disclosure.

Please refer to FIG. 3, which illustrates an optical fingerprint recognition device according to another embodiment of present disclosure. The optical fingerprint recognition device 300 includes a LED array 310, a fingerprint sensing device 320, a back-end processor 330 and a driver circuit 340. The LED array 310 has a plurality of LEDs operated as a plurality of display subpixels, and is configured to display a light source pattern in response to a fingerprint sensing request which may be triggered by a finger touch event. The LED array 310 may provide the light source pattern to emit light to the finger FG, such that the fingerprint sensing device 320 may convert received light from the finger into fingerprint sensing signals.

In this embodiment, a lens 350 and an infrared light (IR) cut filter 360 are disposed between the LED array 310 and the fingerprint sensing device 320. The lens 350 is used to collect the returned light and the IR (infrared light) cut filter 360 allows blue and green light among the returned light to pass through and blocks infrared light. In another embodiment of the present disclosure, the IR cut filter may also block red light wavelength larger than 630 nm (and red light wavelength smaller than 630 nm may pass the IR cut filter).

The fingerprint sensing device 320 further includes an analog to digital converter (ADC) 321 for converting analog sensing signals to digital data regarded as fingerprint image. Similar to the fingerprint sensing device 120 in FIG. 1, the fingerprint sensing device 320 senses the returned light through the IR cut filter 360, and a first sensing pixel area (central sensing pixel area) of the sensing pixel array of the fingerprint sensing device 320 obtains a plurality of first sensing signals by sensing the returned light. The fingerprint sensing device 320 further generate a first fingerprint image according to the first sensing signals by the ADC 321. Furthermore, a second sensing pixel area (surrounding sensing pixel area) of the sensing pixel array of the fingerprint sensing device 320 may also obtain a plurality of second sensing signals by sensing the returned light. The fingerprint sensing device 320 further generate a second fingerprint image according to the second sensing signals by the ADC 321. The ADC 321 may transmit the first fingerprint image and the second fingerprint image to the back-end processor 330.

On the other hand, the fingerprint sensing device 320 further examines whether the finger FG which triggers the fingerprint sensing request is real or fake according to the first fingerprint image. In here, the first fingerprint image may include a plurality of red sensing pixel data, a plurality of blue sensing pixel data and a plurality of background-color sensing pixel data. The fingerprint sensing device 320 may examine whether the finger FG which triggers the fingerprint sensing request is real or fake according to a difference, or a ratio, between a red data and a blue data. The plurality of red sensing pixel data are obtained from sensing pixels of the fingerprint sensing device 320 with red color filter units, the plurality of blue sensing pixel data are obtained from sensing pixels of the fingerprint sensing device 320 with blue color filter units. The red data is generated according to the plurality of red sensing pixel data, and the blue data is generated according to the plurality of blue sensing pixel data. Besides, the plurality of background-color sensing pixel data are obtained from sensing pixels of the fingerprint sensing device 320 with background color filter units.

In this embodiment, the fingerprint sensing device 320 may generate a sum data as a summation of the red data and the blue data, generate a reference data according to the plurality of background-color sensing pixel data obtained from sensing pixels with background-color filter units of the first sensing pixel area. The fingerprint sensing device 320 examines that the finger FG which triggers the fingerprint sensing request is fake in response to that the difference or the ratio between the reference data and the summation data does not fall in a predetermined range which can be defined by a threshold value.

In detail, if the difference, or the ratio, between the red data and the blue data is smaller than the threshold value, the finger FG is real can be determined. On the contrary, if the difference, or the ratio, between the red data and the blue data is not smaller than the threshold value, the finger FG is fake can be determined.

The fingerprint sensing device 320 further transmits a result for indicating the finger FG which triggers the fingerprint sensing request is fake or not to the back-end processor 330. If the result indicates the finger FG is fake, the back-end processor 330 may stop performing the fingerprint recognition according to the result. On the contrary, if the result indicates the finger FG is real, the back-end processor 330 may perform the fingerprint recognition according to the first fingerprint image and the second fingerprint image.

The driver circuit 340 is coupled to the back-end processor 330 and the LED array 310. The driver circuit 340 is a touch sensing and display driver, and in configured to drive the LED array 310 to display the light source pattern in response to the fingerprint sensing request.

On the other hand, in this embodiment, a plurality of micro-lens units ML are disposed above the color filter units of the fingerprint sensing device, where the color filter units cover a sensing pixel array of the fingerprint sensing device. The plurality of micro-lens units ML are disposed under the IR cut filter 360.

Figure 4A:
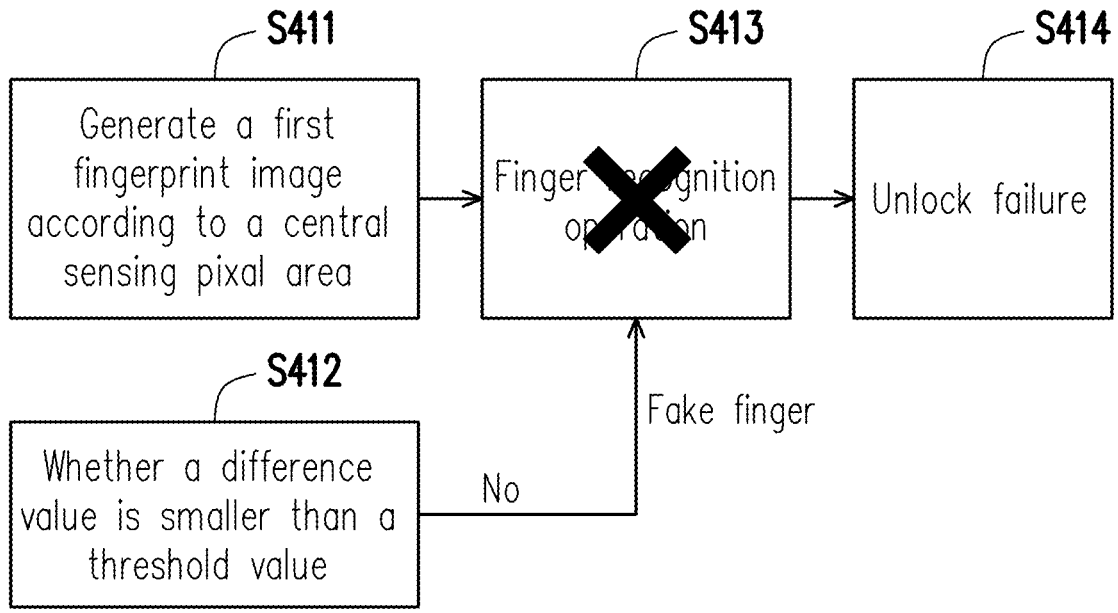
FIG. 4A and FIG. 4B illustrate a flow diagram for fingerprint recognition operations of the optical fingerprint recognition device according to different embodiments of present disclosure.
Figure 4B:
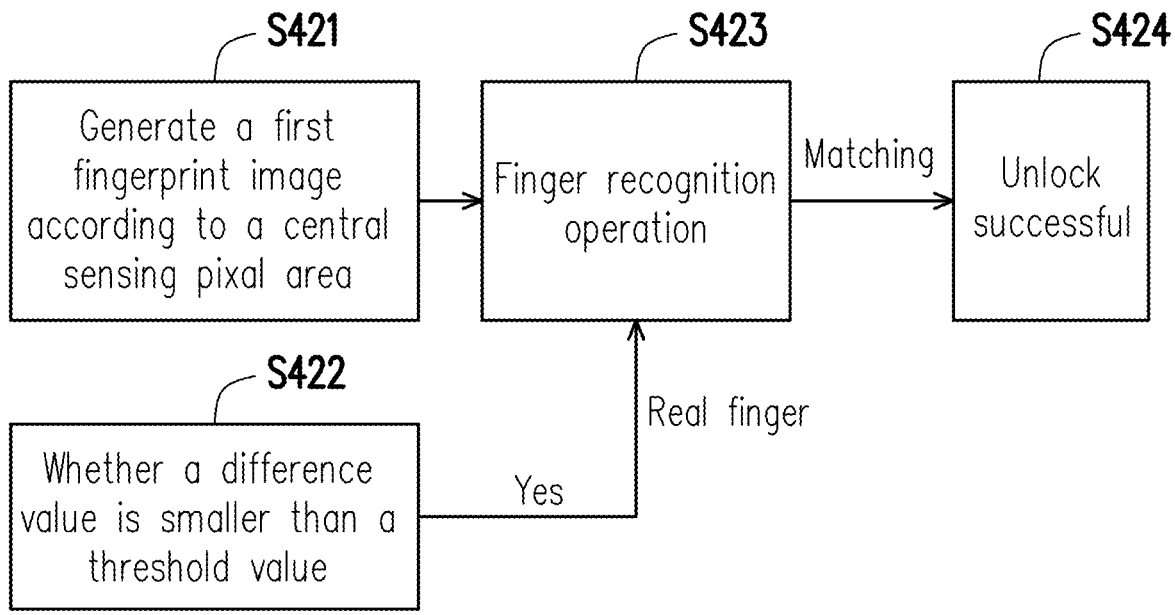

Please refer to FIG. 4A and FIG. 4B, which illustrate a flow diagram for fingerprint recognition operations of the optical fingerprint recognition device according to different embodiments of present disclosure. The flow diagram for fingerprint recognition operations in FIG. 4A and FIG. 4B may be used to perform a security unlock function of an electronic device. In FIG. 4A, in step S411, in response to a fingerprint sensing request, a first fingerprint image according to a central sensing pixel area of a sensing pixel array is generated. In step S412, a difference (or a ratio) between a red data and a blue data of the first fingerprint image can be calculated, and whether the difference (or the ratio) is smaller than a threshold value is determined. If the difference (or the ratio) is not smaller than the threshold value, the finger is fake can be determined. Step S413 for operating fingerprint recognition operation is not executed since the finger is fake, and the security unlock operation is failed in step S414.

In FIG. 4B, in step S421, in response to a fingerprint sensing request, a first fingerprint image according to a central sensing pixel area of a sensing pixel array is generated. In step S422, a difference (or a ratio) between a red data and a blue data of the first fingerprint image can be calculated, and whether the difference (or the ratio) is smaller than a threshold value is determined. If the difference (or the ratio) is smaller than the threshold value, the finger is real can be determined. Since the finger is determined to be real, step S423 is executed to operate fingerprint recognition operation. If the recognized fingerprint matches with a sample of security database the security unlock operation is successful in step S424.

Figure 5A:
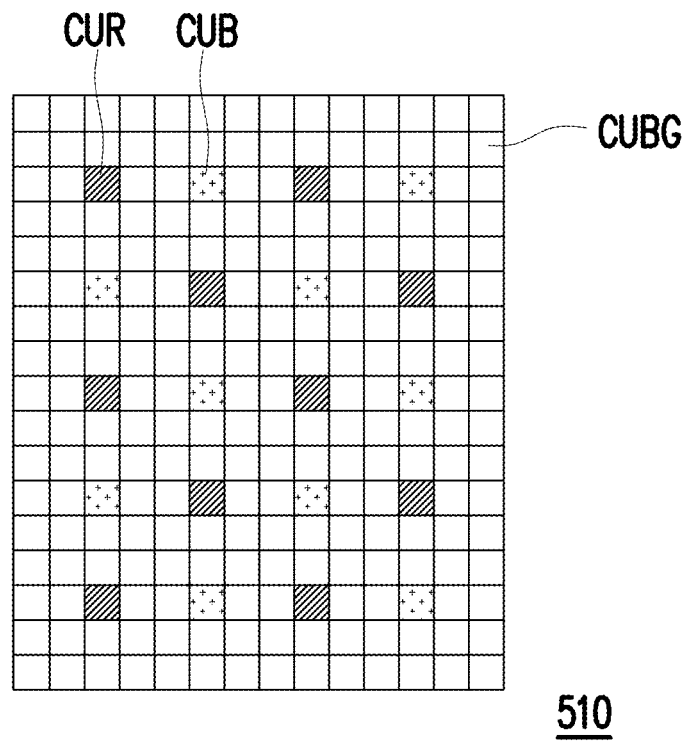
FIG. 5A to FIG. 5F respectively illustrate a plurality of color filters according to a plurality of embodiments of present disclosure.

Please refer to FIG. 5A to FIG. 5F, which illustrate different color filter repeating units according to a plurality of embodiments of present disclosure. In FIG. 5A, the color filter repeating unit 510 includes background-color filter units CUBG, red color filter units CUR and blue color filter units CUB, and each color filter unit, no matter the color it is, is corresponding to a sensing pixel. The background-color filter units CUBG are formed in an array. Each of the background-color filter units CUBG may be cyan or white color filter unit. The red color filter units CUR and blue color filter units CUB are interleaved disposed among the background-color filter units CUBG, and form an array, too. For each of the blue color filter units CUB, 2, 3 or 4 red color filter units CUR are adjacent in different directions. Also, for each of the red color filter units CUR, 2,3 or 4 blue color filter units CUB are adjacent in different directions. In this embodiment, there are 2 background-color filter units CUBG disposed between one red color filter unit CUR and adjacent blue color filter unit CUB.

The number of the background-color filter units CUBG is greater than the number of the red color filter units CUR and the number of the blue color filter units CUB.

Figure 5B:
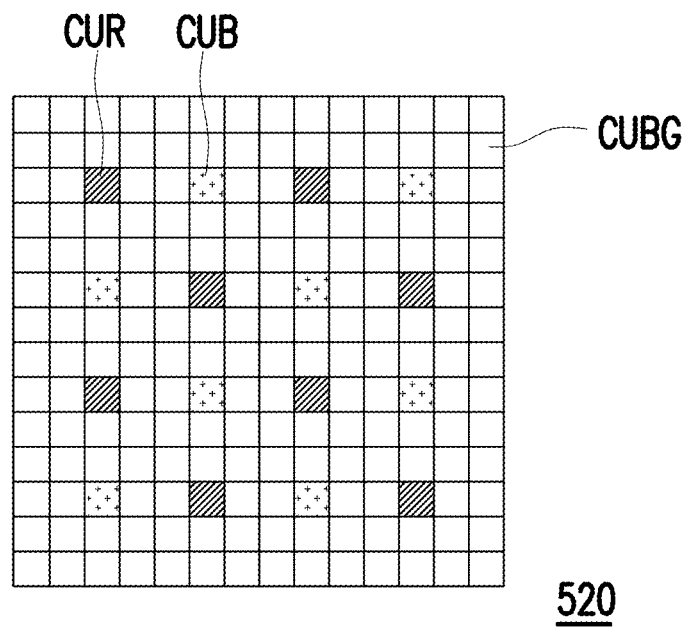

In FIG. 5B, different from the color filter repeating unit 510, a dimension of the color filter repeating unit 520 may be smaller than a dimension of the color filter repeating unit 510. In some embodiment, the dimension of the color filter may be larger than the dimension of the color filter repeating unit 510.

Figure 5C:
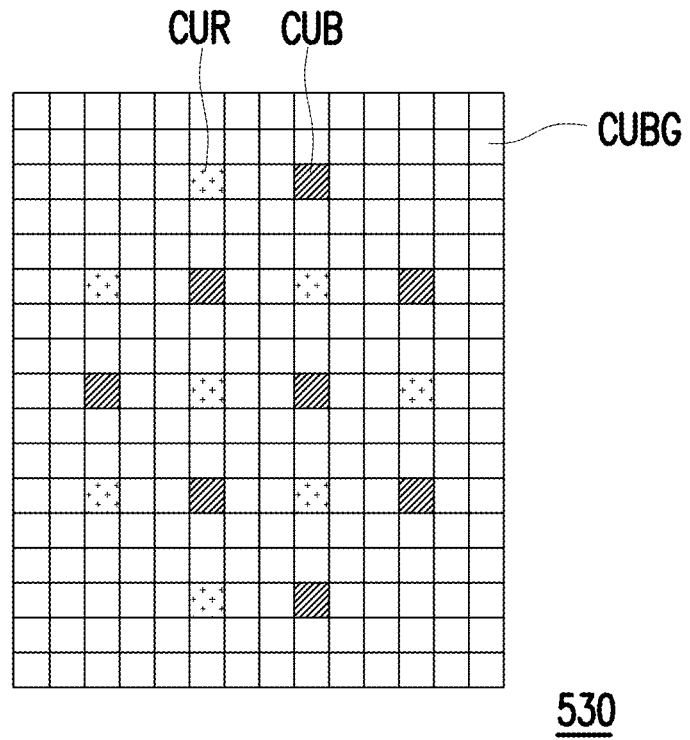
Figure 5D:
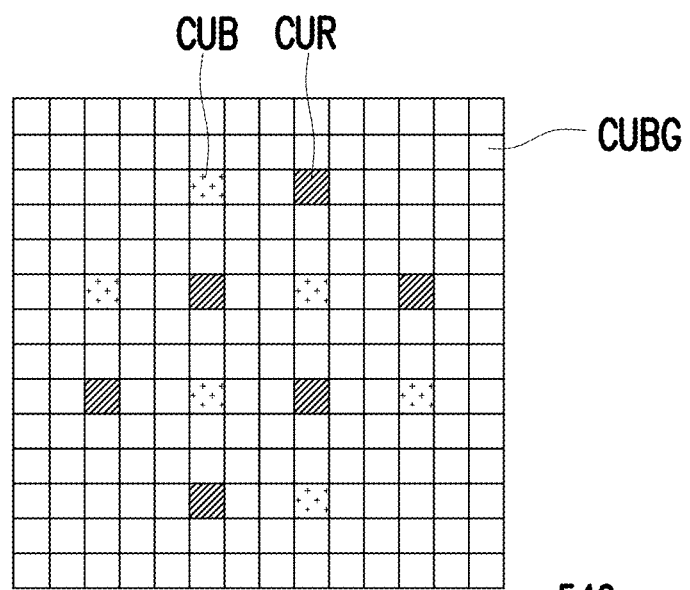

In FIG. 5C, the color filter repeating unit 530 is formed as removing the red color filter units and the blue color filter units disposed on 4 corners of the color filter repeating unit 510. In another aspect, the color filter repeating unit 530 is formed by background-color filter units and two columns of interleaved red and blue color filter units and three rows of interleaved red and blue color filter units crossing in a center. Also, in FIG. 5D, different from the color filter repeating unit 530, a dimension of the color filter repeating unit 540 may be smaller than a dimension of the color filter repeating unit 530. The color filter repeating unit 540 of FIG. 5D is formed by background-color filter units and two columns of interleaved red and blue color filter unit and two rows of interleaved red and blue color filter unit crossing in a center.

Figure 5E:
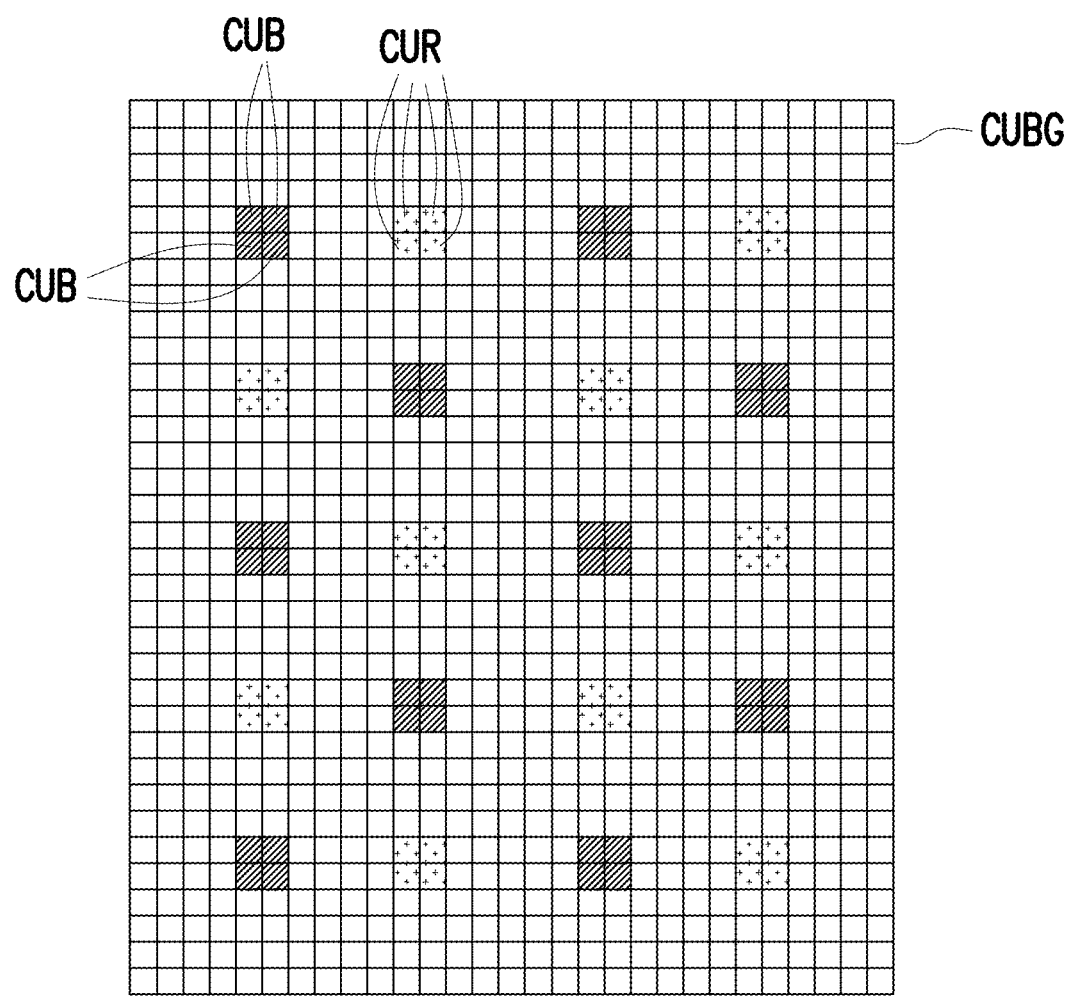
Figure 5F:
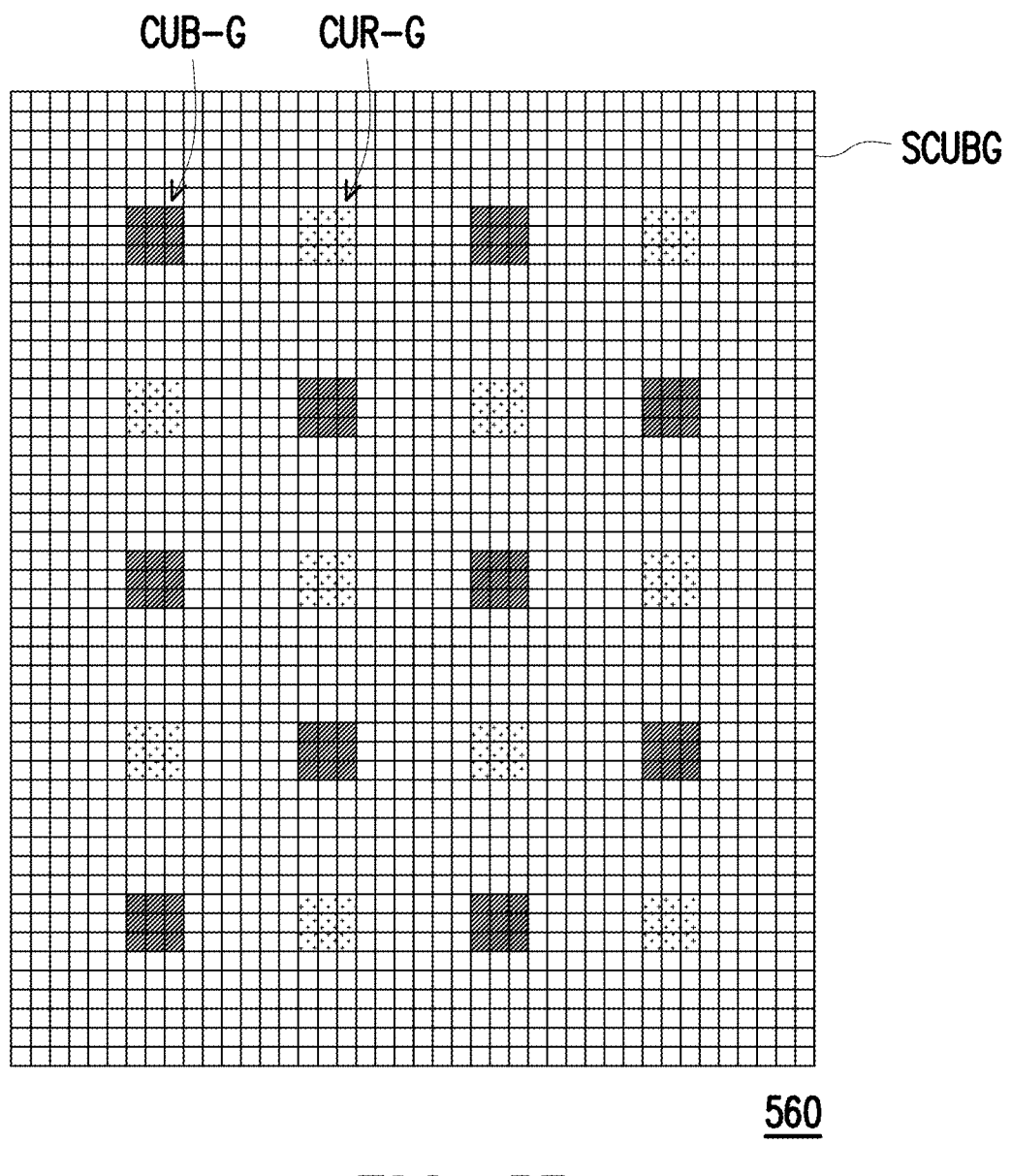

In FIGS. 5E and 5F, for obtaining the color filter repeating unit 550 and the color filter repeating unit 560, a plurality of red color filter units CUR may be neighboring arranged as a group of red color filter units CUR and a plurality of blue color filter units CUB may be neighboring arranged as a group of blue color filter units CUB. The group of red color filter units CUR and the group of blue color filter units CUB are interleaved disposed among the background-color filter units. The group of red or blue color filter units forms an n by n array, and regarding to the example of FIG. 5E, n=2 and regarding to the example of FIG. 5F, n=3. In other embodiment, a color filter repeating unit may be formed by background-color filter units and n columns of interleaved groups of red and blue color filter units and m rows of interleaved groups of red and blue color filter units crossing in a center, where n and m may be different or same integers.

Figure 6A:
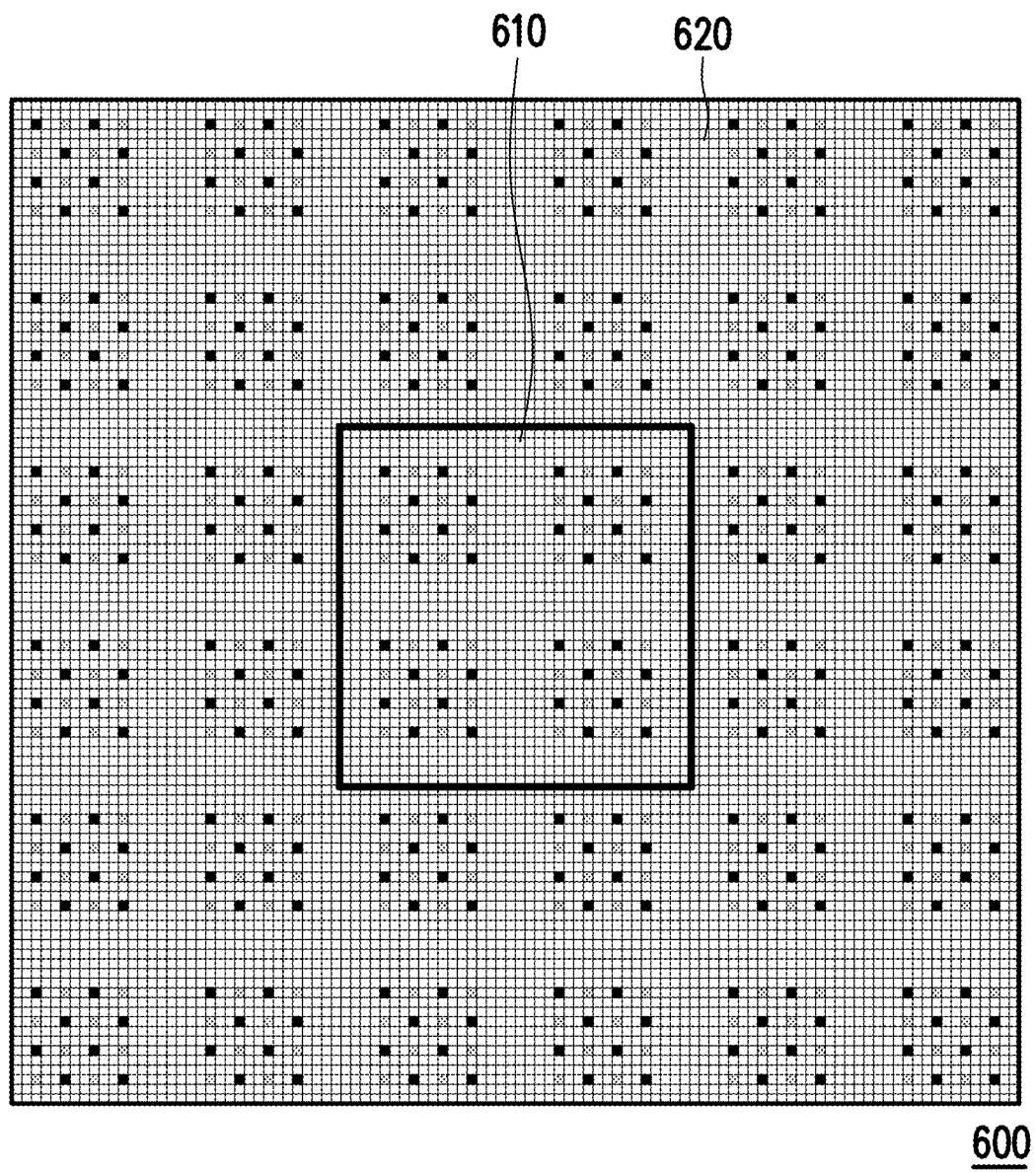
FIG. 6A and FIG. 6B illustrate schematic diagrams of a color filter and corresponding fingerprint image according to an embodiment of present disclosure.
Figure 6B:
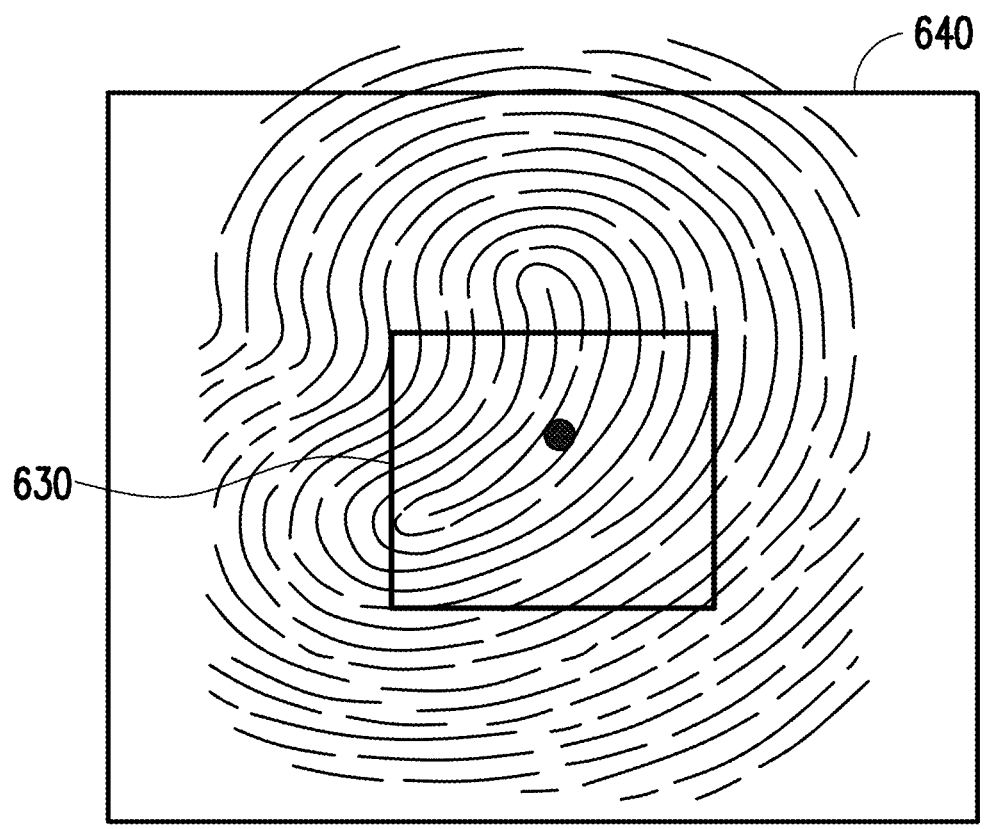

Please refer to FIG. 6A and FIG. 6B, which illustrate schematic diagrams of a color filter and corresponding fingerprint image according to an embodiment of present disclosure. In FIG. 6A, the color filter 600 may be formed by a plurality of color filter repeating unit 510 in FIG. 5A arranged in an array. The color filter 600 may be formed by 36 color filter repeating units 510 and arranged in an array of 6×6 color filter repeating units. The color filter 600 is disposed above a first sensing pixel area 610 and a second sensing pixel area 620 which is surrounding the first sensing pixel area 610.

In FIG. 6B, a fingerprint image 601 includes a first fingerprint image 630 and a second fingerprint image 640. The first fingerprint image 630 is surrounded by the second fingerprint image 640. The first fingerprint image 630 may be generated by the first sensing pixel area 610, and the second fingerprint image 640 may be generated by the second sensing pixel area 620.

Please be noted here, a shape of the first sensing pixel area 610 being rectangle is merely an exemplary example. In fact, the shape of the first sensing pixel area 610 may be circle, oval, polygon or any irregular shape. A shape of an outline of the second fingerprint image 620 may also be circle, oval, polygon or any irregular shape.

An optical fingerprint recognition device according to another embodiment of the present disclosure may display a light source pattern by illuminating only the fourth LEDs operated as green display subpixels of the central LED area for providing green light and not luminating other color display subpixels of the central LED area. Such a light source pattern including a green central portion may be used for fingerprint recognition in a condition which is not unlocking screen but a scenario with a higher security level such as an online payment service, because the green light is adapted for detecting human pulse and is helpful for distinguishing a fingerprint from a living person or a deceased person.

In summary, the optical fingerprint recognition device of present disclosure displays a light source pattern by illuminating an LED array divided into a central LED area and an edge LED area. By displaying only one light source pattern for fingerprint recognition and not illuminating red display subpixels of the central LED area and illuminating red display subpixels of the edge LED area during displaying the only one light source pattern, the optical fingerprint recognition device may spend less time for determining whether the finger which triggers the fingerprint sensing request is fake or real.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical fingerprint recognition device, comprising:
a light-emitting diode (LED) array having a plurality of LEDs operated as a plurality of display subpixels, comprising a central LED area and an edge LED area surrounding the central LED area and configured to display a light source pattern in response to a fingerprint sensing request, wherein the light source pattern comprises a central portion displayed by the central LED area and a surrounding portion surrounding the central portion displayed by the edge LED area, and during displaying the light source pattern, a plurality of first LEDs operated as red display subpixels of the central LED area are not illuminating and a plurality of second LEDs operated as red display subpixels of the edge LED area are illuminating; and
a fingerprint sensing device, comprising a sensing pixel array and color filter units disposed above the sensing pixel array, wherein the sensing pixel array comprises a first sensing pixel area and a second sensing pixel area surrounding the first sensing pixel area, the fingerprint sensing device is configured to generate a first fingerprint image according to a plurality of first sensing signals obtained from the first sensing pixel area, and the first fingerprint image is adapted to be used for examining whether a finger which triggers the fingerprint sensing request is real or fake.

2. The optical fingerprint recognition device as claimed in claim 1, further comprising a back-end processor coupled to the fingerprint sensing device and configured to receive a result indicating that the finger is real or fake from the fingerprint sensing device, wherein the result is generated by the fingerprint sensing device by examining whether the finger which triggers the fingerprint sensing request is real or fake according to the first fingerprint image.

3. The optical fingerprint recognition device as claimed in claim 1, wherein the fingerprint sensing device is configured to generate a second fingerprint image according to a plurality of second sensing signals obtained from the second sensing pixel area and transmit the first fingerprint image and the second fingerprint image to a back-end processor coupled to the fingerprint sensing device, and wherein the back-end processor performs fingerprint recognition according to the first fingerprint image and the second fingerprint image.

4. The optical fingerprint recognition device as claimed in claim 3, wherein the back-end processor stops performing the fingerprint recognition according to a result that the fingerprint sensing device indicates that the finger which triggers the fingerprint sensing request is fake.

5. The optical fingerprint recognition device as claimed in claim 1, wherein an area enclosed by a boundary of the sensing pixel array is less than an area of the light source pattern.

6. The optical fingerprint recognition device as claimed in claim 1, further comprising:
  a lens, arranged between the LED array and the fingerprint sensing device;
  an infrared light cut filter, arranged between the lens and the fingerprint sensing device, configured to filter out infrared lights; and
  a plurality of micro-lens units, disposed above the color filter units covering the sensing pixel array and under the infrared light cut filter.

7. The optical fingerprint recognition device as claimed in claim 1, wherein during displaying the light source pattern, a plurality of third LEDs operated as blue display subpixels and/or a plurality of fourth LEDs operated as green display subpixels of the central LED area are illuminating, and a plurality of fifth LEDs operated as blue display subpixels and/or a plurality of sixth LEDs operated as green display subpixels of the edge LED area are illuminating.

8. The optical fingerprint recognition device as claimed in claim 1, wherein a luminance of the central LED area is less than a luminance of the edge LED area.

9. The optical fingerprint recognition device as claimed in claim 1, wherein the color filter units comprise red color filter units, blue color filter units and background-color filter units, and wherein the number of the background-color filter units is greater than the number of the red color filter units and the number of the blue color filter units.

10. The optical fingerprint recognition device as claimed in claim 9, wherein the background-color filter units are cyan color filter units or white color filter units.

11. The optical fingerprint recognition device as claimed in claim 1, wherein the first fingerprint image comprises a plurality of red sensing pixel data, a plurality of blue sensing pixel data and a plurality of background-color sensing pixel data, and the fingerprint sensing device examines whether the finger which triggers the fingerprint sensing request is real or fake according to a difference, or a ratio, between a red data and a blue data, and
  wherein the plurality of red sensing pixel data are obtained from sensing pixels with red color filter units among the color filter units, the plurality of blue sensing pixel data are obtained from sensing pixels with blue color filter units among the color filter units, the red data is generated according to the plurality of red sensing pixel data, the blue data is generated according to the plurality of blue sensing pixel data.

12. The optical fingerprint recognition device as claimed in claim 11, wherein the fingerprint sensing device examines that the finger which triggers the fingerprint sensing request is fake in response to that the difference or the ratio between the red data and the blue data does not fall in a predetermined range.

13. The optical fingerprint recognition device as claimed in claim 12, wherein the fingerprint sensing device generates a sum data as a summation of the red data and the blue data, generates a reference data according to the plurality of background-color sensing pixel data obtained from sensing pixels with background-color filter units of the first sensing pixel area, and examines that the finger which triggers the fingerprint sensing request is fake in response to that the difference or the ratio between the reference data and the summation data does not fall in a predetermined range.

14. The optical fingerprint recognition device as claimed in claim 1, wherein a plurality of third LEDs operated as green display subpixels of the central LED area are illuminating.

15. The optical fingerprint recognition device as claimed in claim 14, a back-end processor performs fingerprint recognition for a security authorization according to the first fingerprint image and the second fingerprint image when the finger which triggers the fingerprint sensing request is real.

16. A fingerprint sensing device, comprising:
  a sensing pixel array, comprising a first sensing pixel area and a second sensing pixel area surrounding the first sensing pixel area; and
  a plurality of color filter units, disposed above the sensing pixel array,
  wherein the first sensing pixel area is configured to obtain a plurality of first sensing signals and the fingerprint sensing device is configured to generate a first fingerprint image according to the first sensing signals,
  wherein the first fingerprint image is adapted to be used for examining whether a finger which triggers a fingerprint sensing request is real or fake,
  wherein the color filter units comprise red color filter units, blue color filter units and background-color filter units, and wherein number of the background-color filter units is greater than number of the red color filter units and number of the blue color filter units.

17. The fingerprint sensing device as claimed in claim 16, wherein the second sensing pixel area is configured to obtain a plurality of second sensing signals and the fingerprint sensing device is configured to generate a second fingerprint image according to the second sensing signals.

18. The fingerprint sensing device as claimed in claim 17, wherein the fingerprint sensing device provides the first fingerprint image and the second fingerprint image for a fingerprint recognition operation.

19. The fingerprint sensing device as claimed in claim 16, wherein the background-color filter units are cyan color filter units or white color filter units.

20. The fingerprint sensing device as claimed in claim 17, further comprising an analog to digital converter for converting the first sensing signals to the first fingerprint image and converting the second sensing signals to the second fingerprint image.

21. The fingerprint sensing device as claimed in claim 16, wherein the first fingerprint image further comprises a plurality of red sensing pixel data, a plurality of blue sensing pixel data and a plurality of background-color sensing pixel data, and the fingerprint sensing device examines whether the finger which triggers the fingerprint sensing request is real or fake according to a difference, or a ratio, between a red data and a blue data, and
  wherein the plurality of red sensing pixel data are obtained from sensing pixels with red color filter units among the color filter units, the plurality of blue sensing pixel data are obtained from sensing pixels with blue color filter units among the color filter units, the red data is generated according to the plurality of red sensing pixel data, the blue data is generated according to the plurality of blue sensing pixel data.

22. The fingerprint sensing device as claimed in claim 21, wherein the fingerprint sensing device examines that the finger which triggers the fingerprint sensing request is fake in response to that the difference or the ratio between the red data and the blue data does not fall in a predetermined range.

23. The fingerprint sensing device as claimed in claim 22, wherein the fingerprint sensing device generates a sum data as a summation of the red data and the blue data, generates a reference data according to the plurality of background-color sensing pixel data obtained from sensing pixels with background-color filter units of the first sensing pixel area, and examines that the finger which triggers the fingerprint sensing request is fake in response to that the difference or the ratio between the reference data and the summation data does not fall in a predetermined range.

* * * * *